(12) United States Patent
Buchl

(10) Patent No.: US 7,543,655 B2
(45) Date of Patent: Jun. 9, 2009

(54) SELECTIVE POSITION CONTROL SYSTEM AND METHOD

(76) Inventor: Gregg Nathan Buchl, 4576 Castle Cr., Bloomfield, CO (US) 80020

( * ) Notice: Subject to any disclaimer, the term of this patent is extended or adjusted under 35 U.S.C. 154(b) by 0 days.

(21) Appl. No.: 10/774,790

(22) Filed: Feb. 10, 2004

(65) Prior Publication Data
US 2005/0173137 A1 Aug. 11, 2005

(51) Int. Cl.
*A01B 63/111* (2006.01)
(52) U.S. Cl. .............................. 172/4; 60/546
(58) Field of Classification Search ............... 172/2–11, 172/239; 37/348; 701/50; 60/546; 91/171, 91/520, 443, 463, 361, 367, 404, 445
See application file for complete search history.

(56) References Cited

U.S. PATENT DOCUMENTS

| | | | | |
|---|---|---|---|---|
| 4,497,031 A | * | 1/1985 | Froehling et al. | 700/276 |
| 4,734,861 A | * | 3/1988 | Bertolasi et al. | 701/67 |
| 4,930,081 A | * | 5/1990 | Dunkley et al. | 701/52 |
| 4,937,749 A | * | 6/1990 | Dunkley et al. | 701/52 |
| 5,651,193 A | * | 7/1997 | Rhodes et al. | 34/531 |
| 6,493,616 B1 | * | 12/2002 | Rossow et al. | 701/29 |

* cited by examiner

*Primary Examiner*—Robert E Pezzuto
(74) *Attorney, Agent, or Firm*—Mark Murphey Henry; Nathan Price Chaney

(57) ABSTRACT

A selective position control system and method are disclosed. The system includes a processor, remote control and solenoid valve in conjunction with interacting valving, a potentiometer or ultra-sonic device and necessary wiring. The system interfaces wit the tractor's manual hydraulic lever operations which raise or lower equipment by effecting cylinder extensions or retractions. The system is separate from the tractor hydraulic system but interfaces by energizing a solenoid valve that stops oil flow and causes the manually detented tractor hydraulic valve to center from a working position. The system's processor establishes two programmed toggle switch settings; one typically slaved to the other. The system accommodates other manually activated positions, up or down, from the programmed positions, with return to set points of programmed positions. The remote control incorporates a toggle device with three positions, an up/down rocker switch, a set switch and an LED readout.

21 Claims, 7 Drawing Sheets

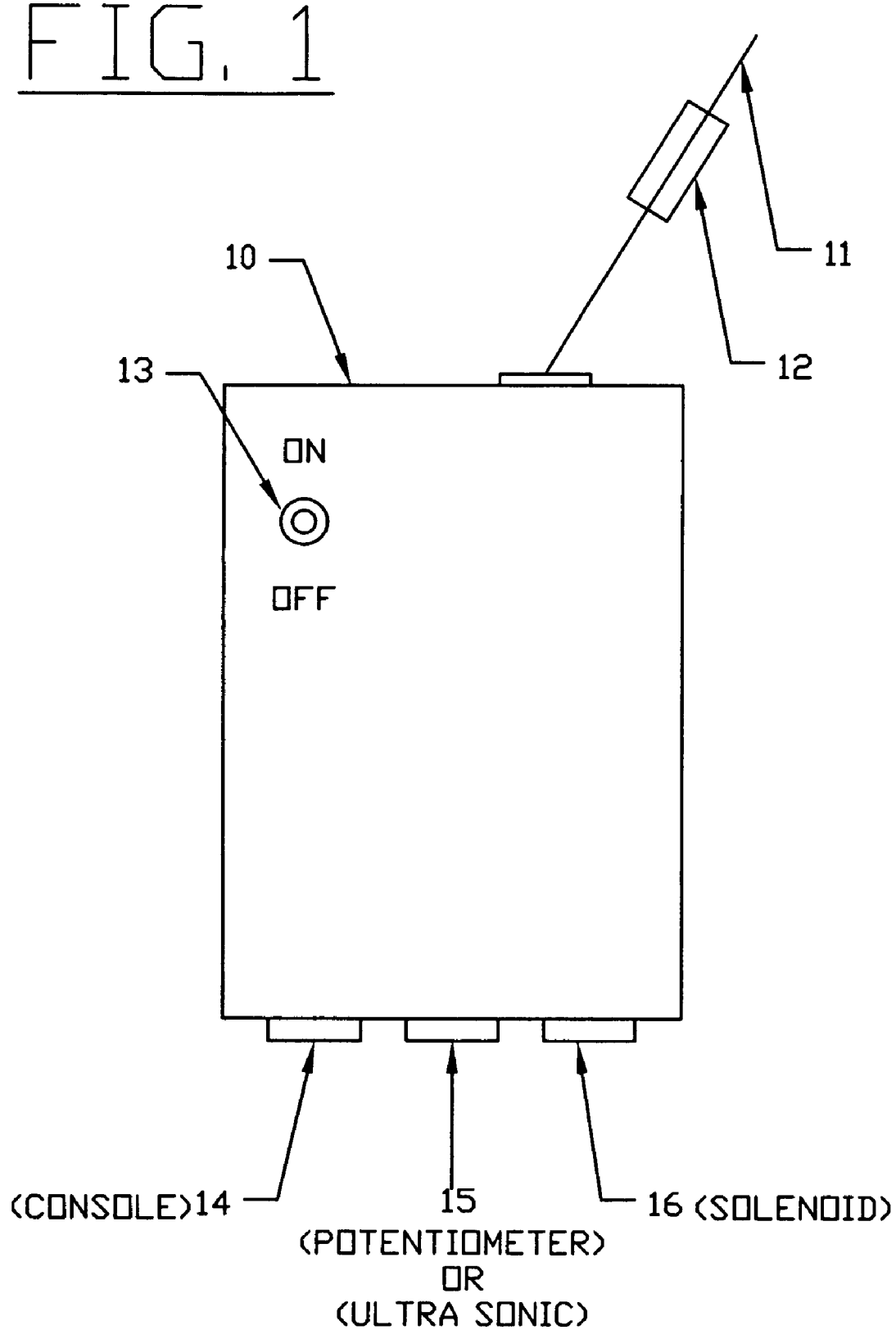

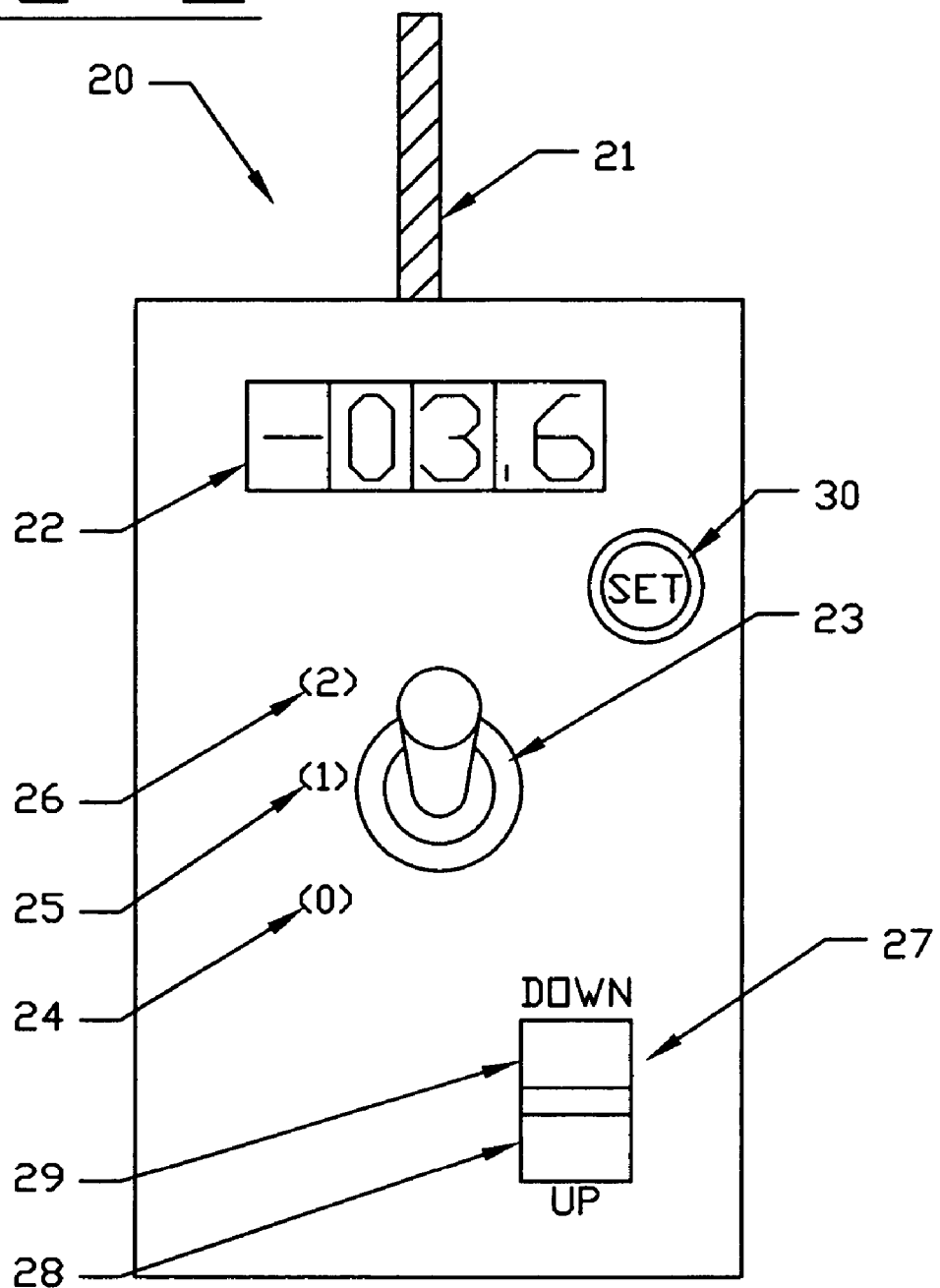

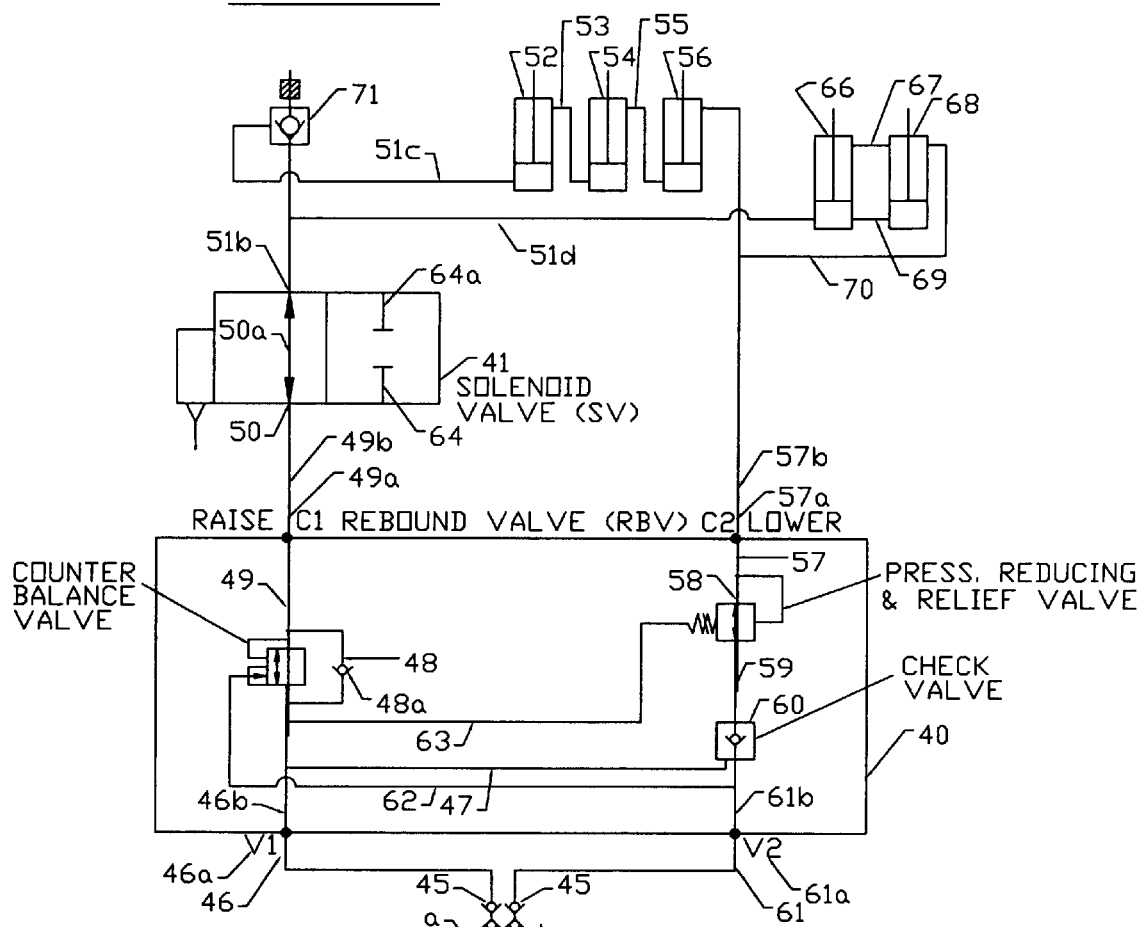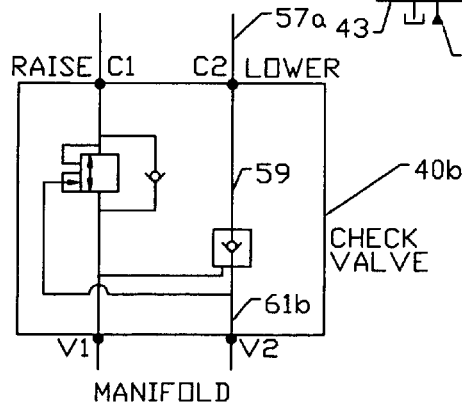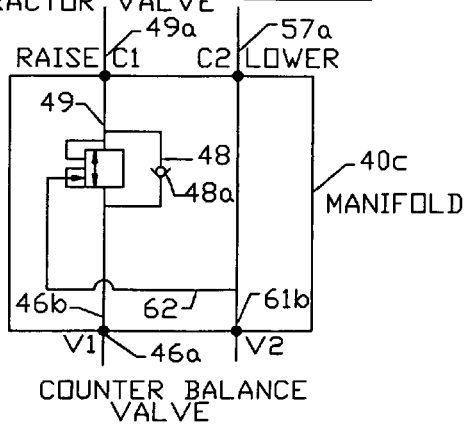

FIG. 4
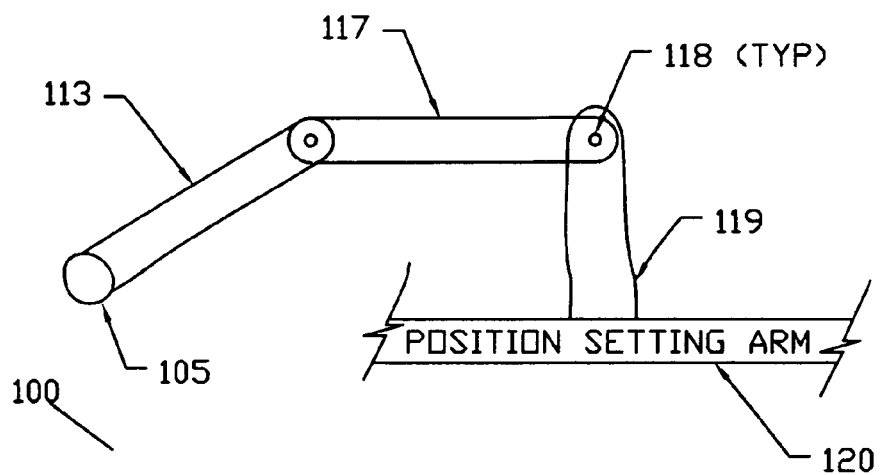
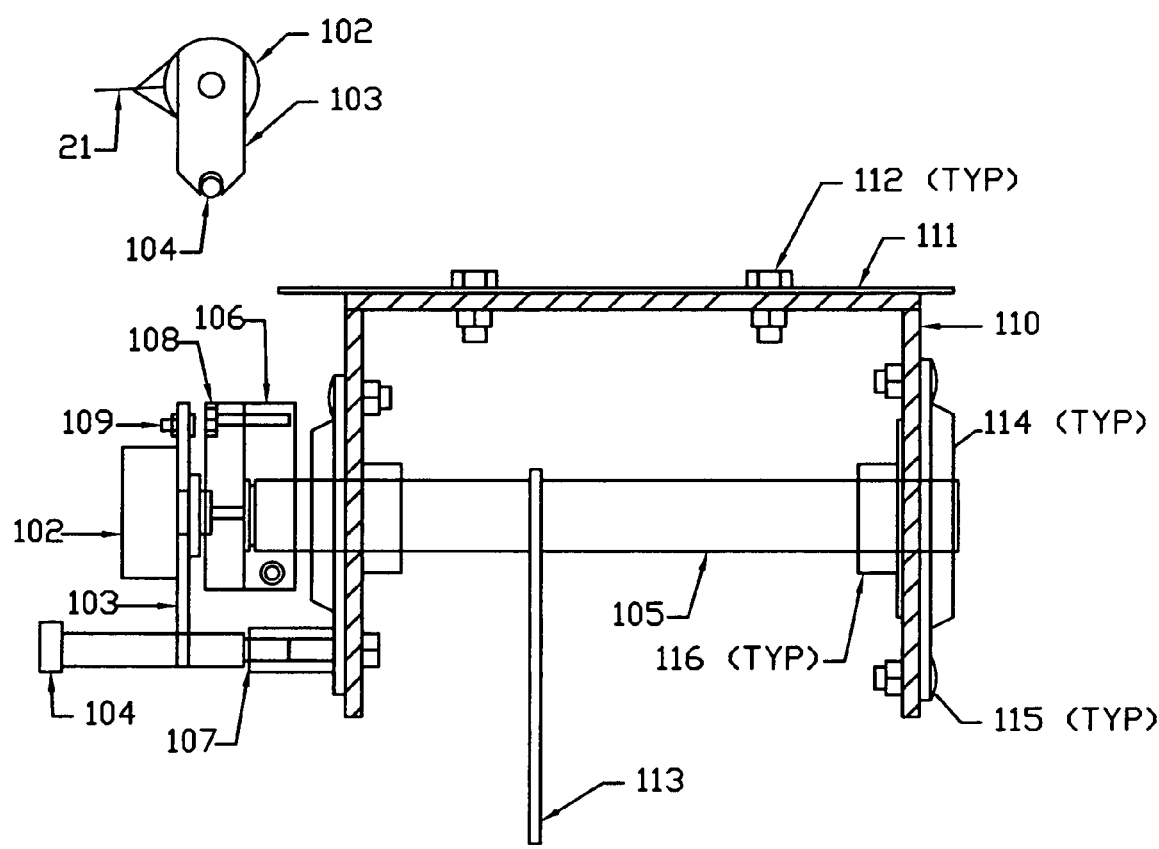

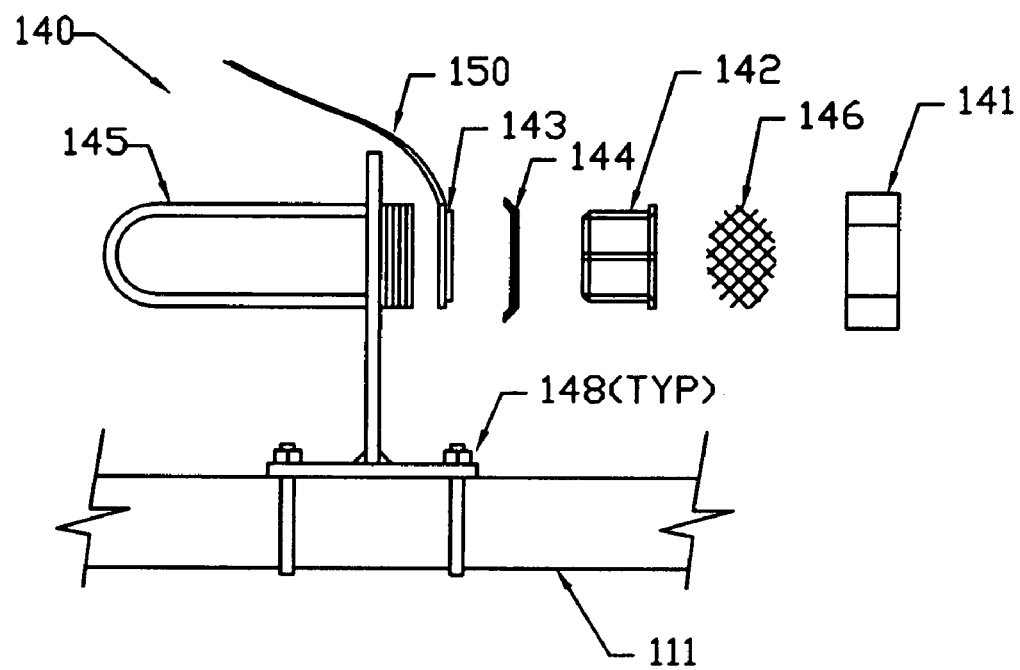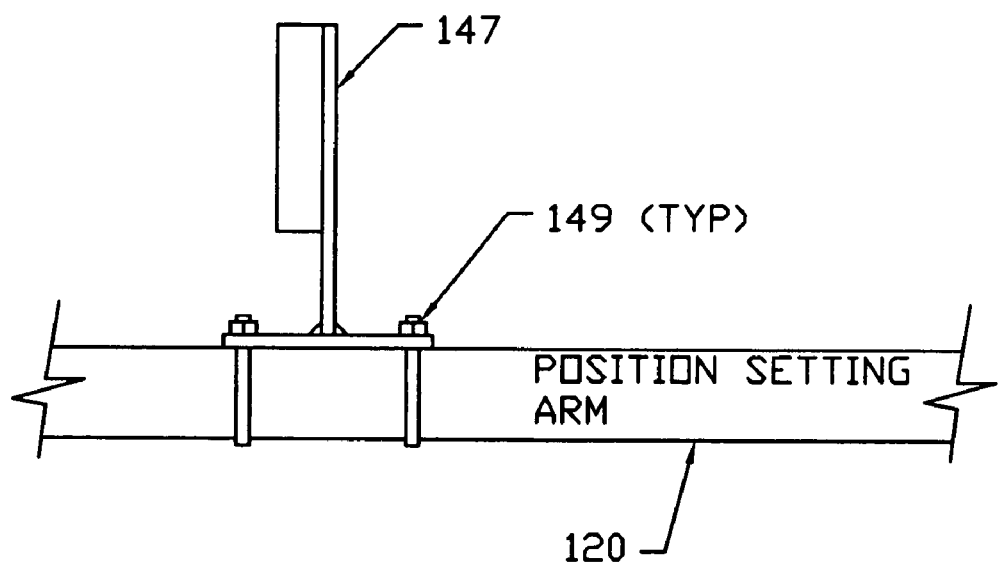

DEPTH SETTING ARM

SELECTIVE POSITION CONTROL SYSTEM AND METHOD

BACKGROUND FOR THE INVENTION

This invention relates in general to a method and apparatus to provide a manual selective position control system, and more particularly to a method and apparatus to selectively control a vertical down or up secured position of an agricultural or other mobile tool using a hydraulic system.

This invention generally relates to the invention disclosed with U.S. Pat. No. 4,825,655 which is incorporated herein in its entirety, that relates to fluid cylinder systems and allows for control of piston stroke position.

Historically, the position of tool penetration for agricultural equipment, or other soil penetration or soil discharge equipment, has been set by mechanical devices which restrict the extension or retraction of hydraulic cylinders. The cylinder(s) is typically mounted between the frame of the implement and the leg of the implement carrier wheel. Thus, height of the frame above the ground, which determines tool penetration, could be hydraulically changed to a more shallow position (i.e., less tool penetration) but not to a yet lower position because of mechanical restrictions.

The prior approach is still in use but does not offer ready access to implement position settings encountered, for example, in farm tillage operations, such as two typical working positions; namely, a tillage depth and an end of the field turning depth. These two positions are typically followed by a full raise, or transport position, of the implement.

Another prior approach still in use is to set the mechanical depth controls to establish a maximum depth for the farm implement. Working positions and turning positions are then searched for by the operator working the hydraulic lever to arrive at certain positions, such as a working depth or turning depth. The maximum depth would be used for deep weeds, leveling of rough ground, or loosen compacted ground.

It is difficult for an operator to find a desired position without cylinder stops because hydraulic flows are in the 10 to 20 gallons per minute range and ground speed typically at six to eight miles per hour. The operator has to gauge implement position by eye rather than from a predetermined set point.

Another example would be soil cutting position and dumping position for the clam shell of a soil mover. Variations in position, for both cut and dump, are typically in the range of one to two inches and are difficult to establish by eye or resistance.

Recently automatic depth control systems have been brought onto the market which control the extension and retraction of the implement carrier cylinder in order to hold a select depth. Such automatic depth control systems are disclosed in Patent Numbers: U.S. Pat. No. 6,216,794 B1; U.S. Pat. No. 6,216,795 B1; U.S. Pat. No. 6,164,385; and U.S. Pat. No. 6,085,846.

Another non-automatic system is sold by John Deere. It is referred to as TouchSet Hydraulics. It is a proprietary system incorporating both a John Deere tractor and a John Deere implement; therefore, restrictive in its application. It further requires a nine pin electrical wiring harness to connect each implement cylinder individually. It further does not have programmable slaving functions. It further does not incorporate a remote solenoid valve or the rebound valve of U.S. Pat. No. 4,825,655.

Thus there is a need for an efficient system that is adaptable to on-the-go farming or industrial practices and offers better control of the working positions for operations on varying soil textures (sand, silt and clay), weather effects upon these soils, and control for various implements, applications and field conditions. In particular, a need for a system which has universal application to tractors and implements.

SUMMARY OF THE INVENTION

To overcome the limitations in the prior art described above, and to overcome other limitations that will become apparent upon reading and understanding the present specification, the present invention discloses a Processor, a Remote Control with a programmable Toggle switch, an up/down Rocker switch, a Set switch and an LED readout Position of penetration or height can be read in inches and $\frac{1}{10}$ of an inch.

Further, the Toggle device has three positions that select either of two programmable set positions or an open Solenoid valve position. The Rocker switch establishes working positions for permanent memory, with permanent memory made with a Set switch.

According to another aspect of the invention, there are two hydraulic integrated manifolds located between the hydraulic source and the implement cylinders.

One manifold has an arrangement of three mechanical valves, the other a Solenoid Valve. Both manifolds mount inline with existing hydraulic lines for open double acting flows in either direction. The Solenoid Valve may be located on either the implement or tractor side of the mechanical valves. The manifolds can be bolted together or separated from each other by hydraulic hoses.

According to still another aspect of this invention, the one hydraulic integrated manifold, located between the hydraulic source and the implement, is functional wherein it retains only the counter-balance valve and the check valve.

According to still another aspect of this invention, the one hydraulic integrated manifold, located between the hydraulic source and the implement, is functional wherein it retains only the counterbalance valve.

According to still another aspect of this invention, an assembly consisting of a bracket, a Potentiometer mechanism and an extending and hinged arm is mounted to the frame of the implement. Another extending arm is mounted onto the position travel arm of the implement. The extending hinged arm of the Potentiometer is connected and hinged to the extending arm of the position travel arm. This mounting enables a disclosure of angle between the implement frame and the legs holding the carrier wheels of the implement. Variations of this angle translate into positions on a vertical scale.

According to still another optional aspect of this invention, an Ultra-Sonic housing and electro-static transducer is mounted to the position travel arm of the implement. A fixed reflector plate is mounted to the frame of the implement. Variations of distance between the transducer and the reflector plate translate into positions on a vertical scale.

Thus there have been outlined rather broadly the more important features of the invention in order that the detailed description thereof may be better understood, and in order that the present contribution to the art may be better appreciated. There are, of course, additional features of the invention that will be described hereinafter and will form the subject matter of the claims appended hereto. Those skilled in the art will appreciate that the conception on which the disclosure is based may readily be utilized as a basis for the designing of other structures for carrying out the invention. It is important, therefore, that the claim be regarded as including such equivalent structures as do not depart from the spirit and scope of the invention.

BRIEF DESCRIPTION OF THE DRAWINGS

Referring now to the drawings in which like reference numbers represent corresponding parts throughout:

FIG. 1 illustrates a Processor according to one embodiment of the present invention.

FIG. 2 illustrates a Remote Control with a programmable Toggle switch according to one embodiment of the present invention.

FIG. 3 illustrates an inline mounting of a hydraulic integrated manifold incorporating three mechanical valves in conjunction with a Solenoid Valve.

FIG. 3A illustrates an in-line mounting of a hydraulic integrated manifold incorporating a counter-balance valve and a check valve in conjunction with a Solenoid Valve.

FIG. 3B illustrates an in-line mounting of a hydraulic integrated manifold incorporating a counterbalance valve in conjunction with a Solenoid Valve.

FIG. 4 illustrates Potentiometer-based position sensor system according to one embodiment of the present invention.

FIG. 5 illustrates an Ultra-Sonic transducer system according to one embodiment of the present invention.

DETAILED DESCRIPTION OF THE INVENTION

Figure 6:
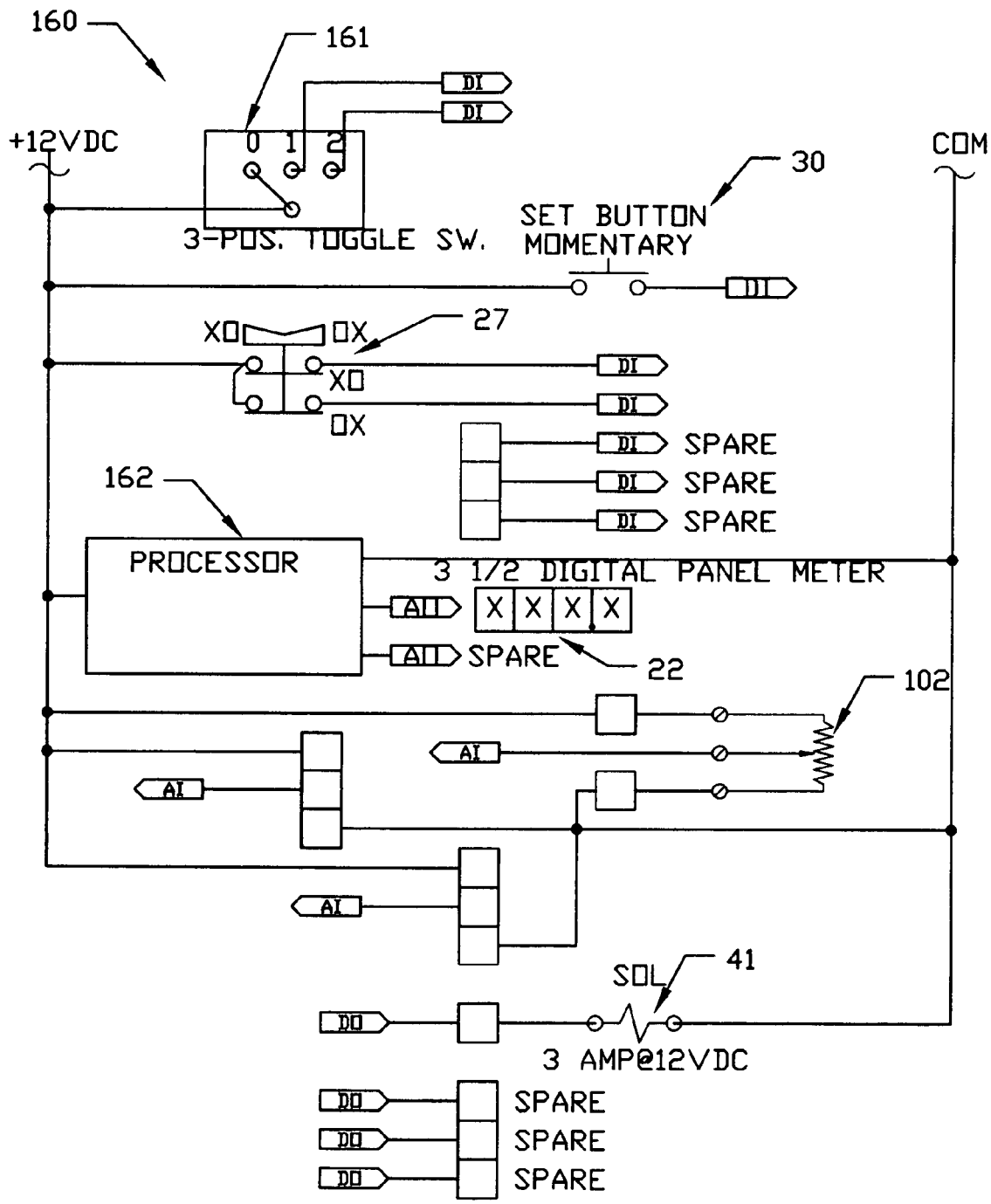
FIG. 6 illustrates a Programmable Logic Control

In the following description of the exemplary embodiment, reference is made to the accompanying drawings which form a part hereof, and in which is shown by way of illustration the specific embodiment in which the invention may be practiced. It is to be understood that other embodiments may be utilized as structural changes and may be made without departing from the scope of the present invention.

FIG. 1 illustrates Processor 10, a twelve volt lead 11, a 10 amp Fuse 12, and with an on-off switch 13. Further shown are connecting ports for remote Console 14, remote potentiometer or ultra-sonic 15, and for remote solenoid valve 16.

FIG. 2 illustrates a Remote Console 20 with connecting cord 21 and a LED 22 readout.

FIG. 2 further shows a three position Toggle device 23 with position (0) 24 being a mode wherein the remote solenoid is de-energized, position (1) 25 being a programmable position setting, and (2) 26 being another programmable position setting.

FIG. 2 further shows a Rocker switch 27 with position setting positions of UP 28 and DOWN 29 in either stationary mode or on-the-go mode. A Set switch 30 which sets a target position, if pressed within two seconds, as established by the Rocker switch 27.

Each of the above switches is shown in the embodiment as rotable switches which permit a variable setting to be selected by user based upon the switches position of rotation. These switches may comprise other switch devices such as a slidable switch or a multi-position switch to achieve the same result without deviating from the scope and spirit of the present invention.

The LED 22 readout may be replaced by another type of light emitting diode, all to retain the same results. Such variations are realistic without deviating from the scope and spirit of the present invention.

FIG. 3 shows two hydraulic integrated manifolds, Rebound Valve (RBV) 40, and Solenoid Valve (SV) 41. A power source 42, four way, three position valve 43 with spool positions [A], [B] and [C], and manual hydraulic lever 44, connects to break-a-ways 45 (typical). Connecting break-a-way 45 connects to line 46 which connects to port V1 46a which connects to line 46b of manifold 40. Line 46b connects to check valve 60 via pilot line 47 and the check valve 48a of the counter-balance valve 48 which connects to line 49 of manifold 40. Line 49 connects to port C1 49a which connects to port 50 of solenoid manifold 41 via line 49b. Port 50 connects to line 50a which connects to port 51b. In the solenoid energized mode, port 50 connects to line 64 which in turn connects to line 64a which connects to port 51b.

FIG. 3 further shows connecting break-a-way 45 connects to line 61 which connects to port V2 61a which connects to line 61b of manifold 40. Line 61b connects both to counter-balance valve 48 via pilot line 62 and the check valve 60 of manifold 40. Check valve 60 connects to line 59 which connects to Pressure Reducing and Relieving valve (PR&R) 58. The PR&R valve 58 connects to drainage line 63 which connects to line 46b and to line 57 which connects to port C2 57a.

Manifold 40 and manifold 41 may be either a single manifold or two separate and independent manifolds connected and secured to each other by O-rings, and bolts running through manifold 41 and turning into manifold 40. Manifold 40 and manifold 41 may also be separate of each other and connected by hoses. Manifold 41 can also be located on either the implement side or the tractor side of manifold 40.

FIG. 3 also shows a series cylinder set as optional to a parallel series cylinder set. In this option, line 51c connects to the piston side of cylinder 52. Line 53 connects the rod side of cylinder 52 to the piston side of cylinder 54. Line 55 connects the rod side of cylinder 54 to the piston side of cylinder 56. Line 57b connects the rod side of cylinder 56 to port C2 57a of manifold 40. In the parallel series cylinder set, line 51d connects the piston side of cylinder 66 with the piston side of cylinder 68 via line 69. Line 67 connects the rod side of cylinder 66 with the rod side of cylinder 68 typically using a torque tube to synchronize the parallel cylinders. The rod side of cylinder 68 connects to line 70 which connects to line 57b. Cylinder 66 can be a stand alone cylinder and the rod side of cylinder 66 connects to line 70 which connects to line 57b. Also shown is an option single point hydraulic stroke control valve 71 which controls the retraction of a set of series cylinders or parallel series cylinders. A single point hydraulic stroke control valve can also be replaced by collars attached to the rod of a cylinder in order to control the retraction of the cylinder(s).

FIG. 3A shows an alternate embodiment of the hydraulic system according to the present invention in which manifold 40 is replaced by manifold 40b. The PR&R valve 58 (FIG. 3) and drainage line 63 (FIG. 3) of manifold 40 are removed wherein line 59 now connects to port C2 57a and line 61b of manifold 40b. In all other respects, this less preferred embodiment operates in the manner described above. However, FIG. 3A, this alternated embodiment, has a inherent weakness in that it does not address the problems of compression and de-compression, and draft relief; nor provides a relief for extensive pressure build-up in the outer series cylinders when used in conjunction with mechanical devices limiting stroke of a hydraulic cylinder.

FIG. 3B further shows another alternate embodiment of the hydraulic system according to the present invention in which manifold 40 is replaced by manifold 40c. The PR&R valve 58 (FIG. 3) and check valve 60 (FIG. 3) of manifold 40 are removed, and port V2 61b connects directly to port C2 57a via line 59. In turn, a counter-balance valve 48 connects to line 46b which connects to port V1 46a, and to line 49 which connects to port C1 49a., and via pilot line 62 to line 59.

However, FIG. 3B, this alternated embodiment has an inherent weakness in that it does not address the problems of compression and de-compression, or cylinder stabilization effected by the combination of PR&R valve 58 (FIG. 3) and Check valve 60 (FIG. 3) when in conjunction with counter-balance valve 48.

FIG. 4 shows Potentiometer assembly 100 which incorporates a bracket 110 secured to the implement frame 111 by bolts 112. Fitted into bracket 110 is an axle 105 with an extended welded arm 113. The axle 105 is secured to bracket 110 by bearings 114 and bolts 115 which in turn are held in place by bearing lock 116. Arm 113 is connected to an extended welded arm 119, which is welded to position travel arm 120, by connecting link 117 and pins 118.

FIG. 4 further shows the Potentiometer assembly 100 which includes a potentiometer 102, a potentiometer set arm 103 and a bolt assembly 104 to secure arm 103. Once axle 105 is under correct positioning, then assembly 106 is secured by bolt 107 and bolt 108 is aligned opposite bolt 109. The electrical grip cord 21 carries the potentiometer 102 voltage signal, that angle between the implement frame and the carrier wheel leg. The position of the tool can thus be determined from this measured angle.

FIG. 4 further establishes the potentiometer assembly 100 mounted on the implement so that the travel of the potentiometer set arm 103 can never exceed the span of the potentiometer 102.

FIG. 5 shows the Ultra-Sonic transducer assembly 140 which is attached to the frame 111 of the implement. The ultra-sonic transducer may be used in addition to, or in place of, the potentiometer sensor (FIG. 4) for obtaining position measurements of the tool. The transducer generates a signal which is transmitted to the Processor that is proportional to the distance between the transducer assembly 140 mounted on the frame and the reflector plate 147 mounted on the position travel arm 120. In one particular embodiment, this transducer element comprises a transducer manufactured by Senix Corp., of Bristol, Vt., Model No. UA-TR-ENU. By measuring this signal, the controller may obtain a measure of the position of a tool. The transducer assembly 140 is mounted to the frame of the implement by U-bolt 148. The housing cap 141 permits the removal of transducer insert 142. The transducer insert 142 holds the transducer 143, an optional protective covering 144, such as Union Ocean Guard material, for the transducer face, and a venting port 145 and an optional protective grill 146 of approximately ¼×¼ grid.

FIG. 5 further shows a reflector plate assembly 147 mounted to the position travel arm 120 by U-bolt 149. Transducer wiring 150 connects by cord to Processor connector 15. The Processor can differentiate between the signal of the Potentiometer and the Ultra-sonic transducer.

FIG. 6 shows a typical diagram 160 of a Programmable Logic Control (PLC) that has logic software to perform functions. The field devices input to the PLC and outputs are controlled by the PLC logic. Positions 161 "0,1,2" (FIG. 2) are inputs for calibration and position. Set button 30 (FIG. 2) input is for establishing set points via the LCD display 22 (FIG. 2) and capturing data base references for vertical positions. Rocker switch 27 (FIG. 2) makes numerical changes to the LCD display 22. The new set point can be established by pressing the Set button 30. The LCD display 22 works with the Processor 162 via serial communications. The Potentiometer 102 (FIG. 4) will control an analog or digital input to the PLC. This input will be scaled in the PLC and the output is to the LCD display 22 in inches. Calibration of points in the system will establish variables in cylinder stroke and implement vertical movement, thus activating Solenoid valve 41 (FIG. 3) and blocking oil flow.

Figure 7:
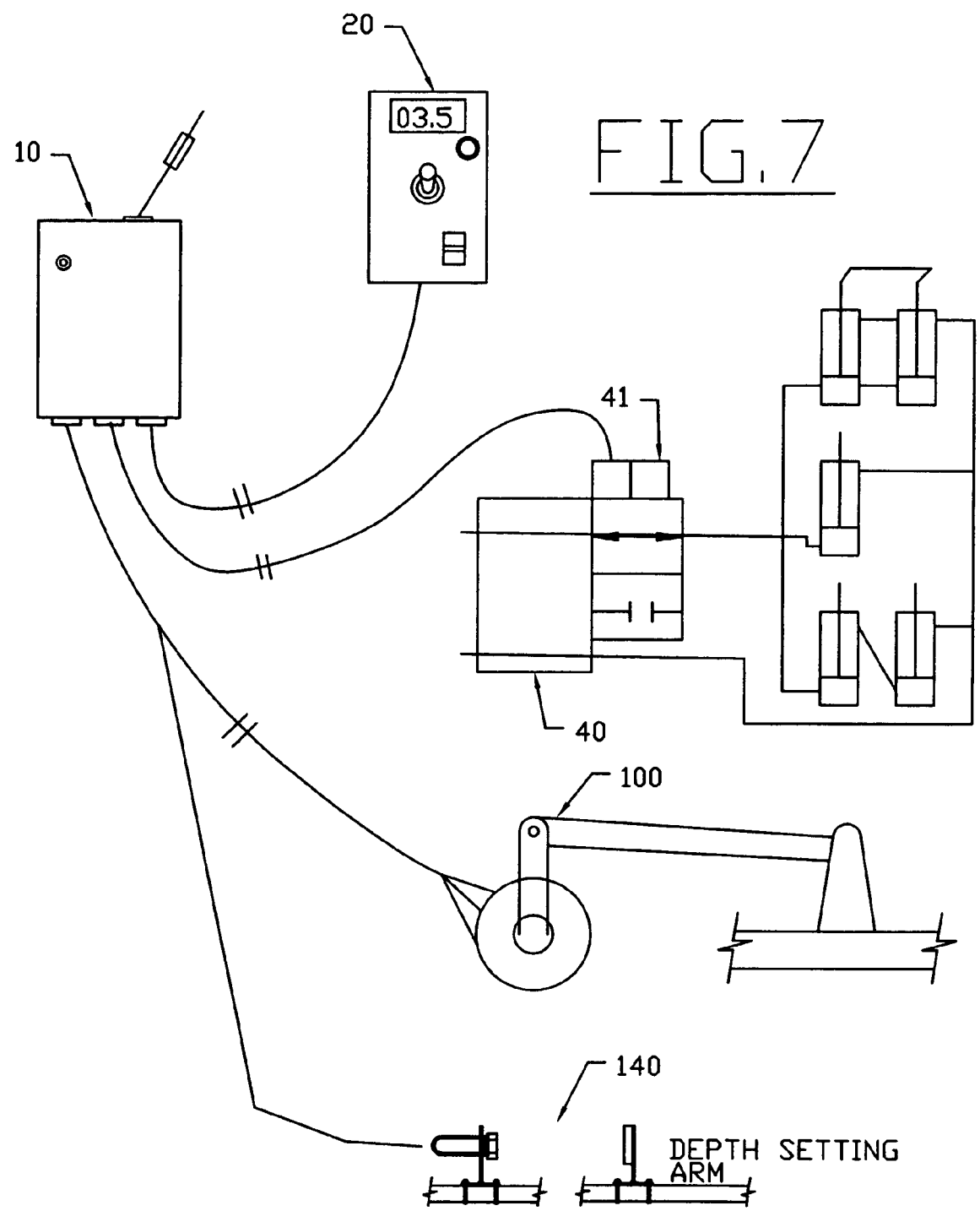
FIG. 7 illustrates an overall view of the present invention

FIG. 7 shows an Overall View of the Selective Depth Control system:
 a. Processor 10
 b. Remote Control 20
 c. Manifold 40 and Manifold 41
 d. Potentiometer Assembly 100
 e. Ultra-Sonic Assembly 140

Rebound Valve Description (RBV)

The Rebound Valve (RBV) 40 (FIG. 3) addresses problems of air ingestion, uneven cylinder rod extensions, and stability when using series cylinders on agricultural implements. The RBV 40 cancels or dampens these problems through the interfacing of three cartridges: the counter-balance valve 48, the PR&R valve 58 and the check valve 60.

The counter-balance valve 48 addresses air ingestion by preventing the implement's series cylinders from running ahead of the oil supply. This prevents a vacuum and air sucking past the rod seals into the cylinders. Since air is highly compressible and expandable, its presence causes spongy and unsynchronized cylinder movements.

The PR&R valve 58 addresses the effects of compression (typically 3000 psi) which expands the hydraulic circuitry, and de-compression (typically zero psi) which returns the circuitry to a relaxed state. De-compression accumulatively transfers excess oil from the series into the outer cylinders. An example of compression to de-compression occurs when the center section of an implement raises to work shallow and the wing tools then ride above the surface. The PR&R valve 58 cancels these effects by maintaining a typical 1000 psi on the rod side of the last series cylinder, and bleeding off higher pressures at a restrictive rate of flow.

The check valve 60 adds stability by trapping the pressure of 1000 psi established by the PR&R valve 58. Implement draft maintains this minimum pressure. The stiffened circuitry stabilizes implement frame and tools.

The counter-balance valve 48 is both a check valve and relief cartridge and therefore provides on-the-go depth selection. The operator can manually select variable working positions on-the-go from the tractor cab. The new work depth will hold to typically 4000 psi before relieving from a higher pressure.

Selective Position Control

Selective Position Control is an electro-hydraulic system that interfaces with the normal manual hydraulic operation of the tractor's hydraulic control system, and is typically separate and independent of the tractor's hydraulic system except for the in-line hydraulic mounting of manifolds 40 and 41. Selective Position Control operates by energizing a remote Solenoid Valve 41 to block tractor hydraulic flow thereby canceling the work modes of the tractor's hydraulic control system, FIG. 3, 43 and 44, and uses the RBV 48 to hold the implement load as determined by programmable electronic set points.

Set-Up Operations for Farm Implements, as an Example:

Travel of an implement position setting arm may not be linear, one-on-one, to tool travel; therefore, the Processor needs reference position points such as "Ground Zero" and "Maximum Depth" as references for LED readout. Maximum height of the implement tool could also be used for reference of travel for reference points but may not be as relative as "Maximum Depth".

1. Ground Zero:
  a. With the implement connected to the tractor, tractor with the engine running, use the tractor hydraulics 42-44 to position tools to just touching the ground surface ("Ground Zero") and then return the tractor hydraulic lever 44 to the neutral position.
b. Turn Processor 10 to the switch 13 "ON" position and the Remote Control toggle switch 23 to the (0) position. Use Rocker switch 27 to set LED 22 to read "00.0". Press and hold SET switch 30 until "00.0" stops flashing and "00.0" holds steady (approximately twelve seconds). "Ground Zero", as a reference point for position is now in the Processor's permanent memory. Turn switch 13 to the "OFF" position.

2. Maximum Depth:
a. With the implement connected to the tractor, tractor with the engine running, drive tractor into field and use tractor hydraulics 42-44 to bring tillage tools to maximum working depth as dictated by field use and/or tractor power capacity, then return the tractor hydraulic lever 44 to the neutral position and turn the tractor off.
b. Turn Console 10 to the switch 13 "ON" position and the Remote Control toggle switch 23 to the (0) position.
c. Measure the actual depth below the ground of the tillage tool tip.
d. Use Rocker switch 27 to set LED 22 to read the actual depth (for example, eight and one half inches) to read "08.5". Press and hold SET switch 30 until 8.5" stops flashing and "08.5" holds steady (approximately twelve seconds).
  Note: Maximum Depth", as a reference point for depth is now in the Processor's permanent memory.
  Note: repeating the above steps resets "Ground Zero" and "Maximum Depth", a "00.0" setting will always represent "Ground Zero"; a number setting, for example, "08.5" will always represent "Maximum Depth".

3. Programmable Positions

Two programmable positions are working depth (2) 26 and shallow depth (1) 25. Programming can only take place after "Ground Zero" and "Maximum Depth" are established. Setting working depth (2) 26 and shallow depth (1) 25 can be made with tractor and implement in a stationary position. Set points are being established based on reference points already in software memory. It is preferable in software that working depth (2) 26 and shallow depth (1) 25 are slaved to each other wherein both position 26 and 25 become the same working depths, wherein with the toggle device 23 in the (2) 26 position, manual use of the hydraulic lever 44 to effect a raise will raise the implement to the shallow depth; with the toggle device 23 in the shallow (1) 25 position, manual use of the hydraulic lever 44 to effect a raise will raise the implement to full raise. Shallow depth is normally a depth to erase the tractor tire lug marks in the soil during turns at the end of the field.
  a. Working Depth (2) 26, (3 inches used as an example)
    1. switch 13 "ON"
    2. move toggle switch 23 to (2) 26 position
    3. use Rocker switch 27 to set "03.0" LED 22 readout
    4. press Set switch 30 within two seconds
    5. LED 22 will flash "03.0" twice than hold steady
    6. working depth (2) of "03.0" now in software memory
  b. Shallow Depth (1) 25, (1½ inches used as an example)
    1. switch 13 "ON"
    2. move toggle switch 23 to (1) position
    3. use Rocker switch 27 to set "01.5" LED 22 readout
    4. press Set switch 30 within two seconds
    5. LED 22 will flash "01.5" twice than hold steady
    6. shallow depth (1) of "01.5" now in software memory 4. Switch Functions
a. Console 20 Functions with Processor switch 13 "ON"
  1. Toggle switch 23 in (0) 24 position
    a. solenoid valve 41 is de-energized
    b. manual hydraulic lever 44 function is normal
    c. remote LED 22 will show tool depth
  2. Toggle switch 23 in (1) 25 position
    a. solenoid valve 41 energizes at working depth
    b. detente release centers hydraulic lever 44
    c. manual hydraulic UP goes to full raise
  3. Toggle switch 23 in (2) 26 position (software slaving)
    a. solenoid valve 41 energizes at working depth
    b. detente release centers hydraulic lever 44
    c. manual hydraulic UP goes to shallow depth
    d. manual hydraulic DN goes to working depth
    e. toggle switch 23 to (0) 24 for full raise
  b. Correcting to actual depths "On-The-Go"
    1. same for either (2) 26 (working) or (1) 25 (shallow)
    2. move toggle switch 23 to either (2) 26 or (1) 25
    3. use Rocker switch 27 to select actual depth
    4. press SET switch 30 within two seconds
    5. LED 22 will flash correct depth twice then hold steady
    6. correct depth now in permanent memory
  c. Use of Rocker Switch 27
    1. Press Rocker switch 27 once each way within 2 seconds
      a. LED 22 will flash settings in permanent memory twice
        i. "00.0"—ground zero
        ii. "08.5"—maximum depth (example)
        iii. "03.0"—working depth (example)
        iv. "01.5"—turning depth (example)
      b. LED 22 will then return to previous readout
    2. Press Toggle switch 27 once and release
      a. "UP" 28 will flash working depth in permanent memory twice
      b. "DN" 29 will flash shallow depth in permanent memory twice
      c. LED 22 will then return to previous readout
    3. Press Toggle switch 27 and hold
      a. "UP" 28 will scroll up
      b. "DN" 29 will scroll down 5. Field Operation
  Note: The (0) position 24 on the toggle switch 23 de-energizes SV 41 and provides normal hydraulic operation. The toggle switch must be moved to a position of (2) 26 or (1) 25, with the switch 13 "ON", for select depth control to work. Full raise, to bypass software slaving of position (2) 26, requires the Toggle switch 23 to be moved to (0) 24 position.
  a. Working Depth (1) 25, (example is 3 inches)
    1. pull into the field with tractor, implement in raised position
    2. switch 13 "ON"
    3. Toggle 23 in (1) position 25
    4. move hydraulic lever 44 to lower implement
    5. implement will go to depth (1) 25 (3 inches)
    6. solenoid valve 41 energizes for 3 seconds
    7. hydraulic lever 44 centers
    8. manually move hydraulic lever 44 for full raise
    9. manually move hydraulic lever 44 to lower implement
  b. Working Depth (2) 26, (example is 3 inches)
    1. Toggle in (2) position 26
    2. manually move hydraulic lever 44 to lower implement
    3. implement will go to depth (2) 26 (3 inches)
    4. solenoid valve 41 energizes for approximately 3 seconds
    5. tractor hydraulic lever 44 centers
    6. manually move hydraulic lever 44 to raise for shallow depth (1½ inches)

7. manually move hydraulic lever 44 to lower implement working depth (3)
8. Toggle switch 23 to (0) position 24 for full raise Again, many field operations consist of just two functions: working depth and shallow depth (end of field turning). In the (2) position 26, these two functions are slaved and always sequence each other. For full raise, move Toggle switch 23 to the (0) position 24.

Programming Software Points
1. Rocker switch will change readout, upon second activation as rapidly as switch is activated
2. When lowering implement, energize solenoid valve 2/10 inch before actual set point (adjustment for oil compression). This setting is programmable.
3. When raising implement, energize solenoid valve at actual set point
4. The LED readout holds a +/−1/10 inch span; that is, a depth point of "03.0" can be "02.9" or "03.1". This setting is programmable.
5. If implement hydraulics drift beyond the +/− span LCD will follow a decreasing or increasing set point and blink every second to show
6. If drift is a result of draft forces, the LCD will discontinue blinking upon LCD returning to the +/− set point
7. If LED continuously returns to set point three times while Console is "ON", software will show variation only every two seconds.
8. The software ignores the shallow depth when the Toggle switch is in position 26 and the LED readout is increasing The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description but rather by the claims appended hereto:

What is claimed is:

1. A manual electro-hydraulic selective depth control system for establishing a set position of a device above the ground as the device is moved across a surface, the selective depth control system comprising:
   a. a toggle input device for specifying a plurality of position settings;
   b. a device position sensor for determining a measured device position; and
   c. a hydraulic position control system having a processor programmed with a ground zero position and a programmed maximum depth position for the device, wherein the hydraulic position control system maintains a set position corresponding to the measured device position within a specified position within a specified position window around the set position programmed relative to the ground-zero and maximum-depth position;
   d. wherein the toggle input device comprises:
   e. a working position that places the set position at one of said programmed positions;
   f. a shallow position that places the set position at a minimum deployed depth;
   g. a zero position that places the hydraulic position control system in a permanent de-energized mode.

2. The manual electro-hydraulic selective depth control system according to claim 1 wherein the toggle input device further comprises a widow size control input for specifying a size for the position window used by the hydraulic control system.

3. The manual electro-hydraulic selective depth control system according to claim 1, wherein the device position sensor is a potentiometer-based system.

4. The manual electro-hydraulic selective depth control system according to claim 1, wherein the device position sensor is an ultra-sonic transducer-based system.

5. The manual electro-hydraulic selective depth control system according to claim 1, wherein the toggle input device further comprises:
   a. a set switch for setting the programmed position for use when the toggle input device is toggled between the device's current position and a new position of the device; and
   b. an up/down rocker switch for adjusting the current position of the device.

6. The manual electro-hydraulic selective depth control system according to claim 5, wherein the shallow position corresponds to a programmable position having a default position 1.5 inches deeper than the ground-zero position.

7. The manual electro-hydraulic selective depth control system according to claim 5, wherein the shallow position is slaved to the working position in that a manual raising of the hydraulic position control system will move the set position from the working position automatically to the shallow position.

8. The manual electro-hydraulic selective depth control system according to claim 5, wherein the working position corresponds to a programmable position having a default position 3.0 inches deeper than the ground-zero position.

9. The manual electro-hydraulic selective depth control system according to claim 1, wherein the manual electro-hydraulic selective depth control system further comprises a device position display unit comprising a numeric LED display element.

10. The manual electro-hydraulic selective depth control system according to claim 9, wherein the numeric LED display element shows depth in inches with a decimal point to show tenths of an inch.

11. The manual electro-hydraulic selective depth control system according to claim 1, wherein the hydraulic position control system further comprises a remote two-way, two position, normally open solenoid valve.

12. A manual electro-hydraulic selective depth control system for establishing a set position of a device above the ground as the device is moved across a surface, the selective depth control system having a hydraulic position control system comprising a processor programmed to enable a slaving of a shallow position and a working position, comprising:
   a. a first input device wherein the shallow position is not slaved to the working position;
   b. a second input device wherein the working position is slaved to the shallow position; and
   c. a third input device wherein the working position and the shallow position are not slaved.

13. The manual electro-hydraulic selective depth control system according to claim 12 wherein only one of the first input device, second input device, and third input device are enabled at any given time.

14. The manual electro-hydraulic selective depth control system according to claim 12, wherein the shallow position is not slaved to the working position thereby having its own programmable depth, and in that a manual raising of the hydraulic position control system will move the set position from the shallow position to a full raise position.

15. The manual electro-hydraulic selective depth control system according to claim 12, wherein the shallow position is slaved to the working position in that a manual raising of the hydraulic position control system will move the set position from the working position automatically to the shallow position.

16. The manual electro-hydraulic selective depth control system according to claim 12, wherein the working position and the shallow position are not slaved and a manual lowering of the hydraulic position control system will move the set position from a full raise position to the working position, bypassing the shallow position.

17. A manual electro-hydraulic selective depth control system for establishing a set position of a device above the ground as the device is moved across a surface, the selective depth control system having a hydraulic position control system, the selective depth control system comprising:
 a. a first hydraulic manifold wherein a counter-balance valve is coupled to a solenoid activated valve, a pressure reducing and relieving valve, and check valve;
 b. a second hydraulic manifold wherein a counter-balance valve is coupled to a solenoid activated valve and a check valve; and
 c. a third hydraulic manifold wherein a counter-balance valve is coupled to a solenoid activated valve.

18. The manual electro-hydraulic selective depth control system according to claim 17 wherein only one of the first hydraulic manifold, second hydraulic manifold, and third hydraulic manifold are enabled at any given time.

19. The manual electro-hydraulic selective depth control system according to claim 17, wherein the first hydraulic manifold further comprises:
 a. the solenoid activated valve is configured to cease delivery of hydraulic fluid to the hydraulic position control system;
 b. the counter balance valve is configured to prevent air ingestion, to act as a holding valve, and to act as a relief valve;
 c. the pressure reducing and relieving valve is configured to provide an adjustable and controlled pressure to the hydraulic position control system; and
 d. the check valve is configured to operate in conjunction with the counter balance valve.

20. The manual electro-hydraulic selective depth control system according to claim 17 wherein the second hydraulic manifold further comprises:
 a. the solenoid activated valve is configured to cease delivery of hydraulic fluid to the hydraulic position control system;
 b. the counter balance valve is configured to prevent air ingestion, to act as a holding valve, and to act as a relief valve; and
 c. the check valve is configured to operate in conjunction with the counter balance valve.

21. The manual electro-hydraulic selective depth control system according to claim 17 wherein the third hydraulic manifold further comprises:
 a. the solenoid activated valve is configured to cease delivery of hydraulic fluid to the hydraulic position control system; and
 b. the counter balance valve is configured to prevent air ingestion, to act as a holding valve, and to act as a relief valve.

\* \* \* \* \*